(12) United States Patent
Murata et al.

(10) Patent No.: US 8,248,508 B2
(45) Date of Patent: Aug. 21, 2012

(54) DISTORTION CORRECTING METHOD, DISTORTION CORRECTING DEVICE, PROGRAM RECORDING MEDIUM AND ELECTRONIC CAMERA

(75) Inventors: Tsukasa Murata, Yamato (JP); Sadami Okada, Kawasaki (JP)

(73) Assignee: Nikon Corporation, Tokyo (JP)

( * ) Notice: Subject to any disclaimer, the term of this patent is extended or adjusted under 35 U.S.C. 154(b) by 382 days.

(21) Appl. No.: 12/491,710

(22) Filed: Jun. 25, 2009

(65) Prior Publication Data

US 2009/0262231 A1    Oct. 22, 2009

Related U.S. Application Data

(63) Continuation of application No. PCT/JP2007/001445, filed on Dec. 20, 2007.

(30) Foreign Application Priority Data

Dec. 27, 2006  (JP) ................................. 2006-353190
Dec. 27, 2006  (JP) ................................. 2006-353191

(51) Int. Cl.
*H04N 3/14*    (2006.01)
*H04N 5/262*   (2006.01)
*G03B 13/00*   (2006.01)

(52) U.S. Cl. ......................... 348/335; 348/347; 348/239

(58) Field of Classification Search ................... 348/46, 348/241, 335, 347, 345, 351, 239; 358/3.26, 358/474, 488; 382/255, 275
See application file for complete search history.

(56) References Cited

U.S. PATENT DOCUMENTS

| 6,323,934 | B1 * | 11/2001 | Enomoto | ........................ 355/40 |
| 6,747,757 | B1 | 6/2004 | Enomoto | |
| 2001/0014180 | A1 | 8/2001 | Ejiri et al. | |
| 2004/0093432 | A1 * | 5/2004 | Luo et al. | ....................... 709/247 |
| 2004/0233301 | A1 | 11/2004 | Nakata et al. | |
| 2005/0213159 | A1 * | 9/2005 | Okada et al. | ................. 358/3.26 |
| 2005/0280877 | A1 | 12/2005 | Watanabe | |
| 2008/0175514 | A1 * | 7/2008 | Nose et al. | ..................... 382/275 |

FOREIGN PATENT DOCUMENTS

JP    2000-125175    * 4/2000
(Continued)

OTHER PUBLICATIONS

Japanese Office Actions dated Jul. 26, 2011 for Japanese Patent Application Nos. 2007-329163 and 2006-353191.

*Primary Examiner* — Lin Ye
*Assistant Examiner* — Euel Cowan
(74) *Attorney, Agent, or Firm* — Arent Fox LLP

(57) ABSTRACT

In a preparation operation of a distortion correcting method, actual measured lens position information obtained by an optical system at a time of shooting an image, an error range in the lens position information, and a relational expression between a distortion pattern and the lens position information, are respectively obtained. In a correcting operation, actual measured data of the lens position information is fit to the relational expression to estimate the distortion pattern of the image shot by the optical system, and a temporary corrected image is obtained. In a selection operation, a distortion correcting pattern to be applied in main correcting performed on the image is selected based on the temporary corrected image. In a repeating operation, when the distortion correcting pattern is not selected, a value of the actual measured data is adjusted within the error range and the correcting operation is repeated.

20 Claims, 10 Drawing Sheets

FOREIGN PATENT DOCUMENTS

| | | |
|---|---|---|
| JP | 2000-125175 A | 4/2000 |
| JP | 2003-219246 A | 7/2003 |
| JP | 2004-007303 A | 1/2004 |
| JP | 2004-053336 A | 2/2004 |
| JP | 2004-350130 A | 12/2004 |
| JP | 3631370 B2 | 12/2004 |
| JP | 2005-168054 A | 6/2005 |
| JP | 2005-333575 A | 12/2005 |
| JP | 2006-81145 A | 3/2006 |

* cited by examiner

| VALUE OF FOCAL POSITION DATA | ERROR RANGE (RANGE OF TRUE VALUE) |
|---|---|
| 0.3m | 0.3m~0.35m |
| ⋮ | ⋮ |
| ∞ | 3m~∞ |

| VALUE OF FOCAL DISTANCE DATA | ERROR RANGE (RANGE OF TRUE VALUE) |
|---|---|
| 10.5mm | 10mm~11mm |
| 12mm | 11mm~13mm |
| ⋮ | ⋮ |
| 47mm | 45mm~50mm |

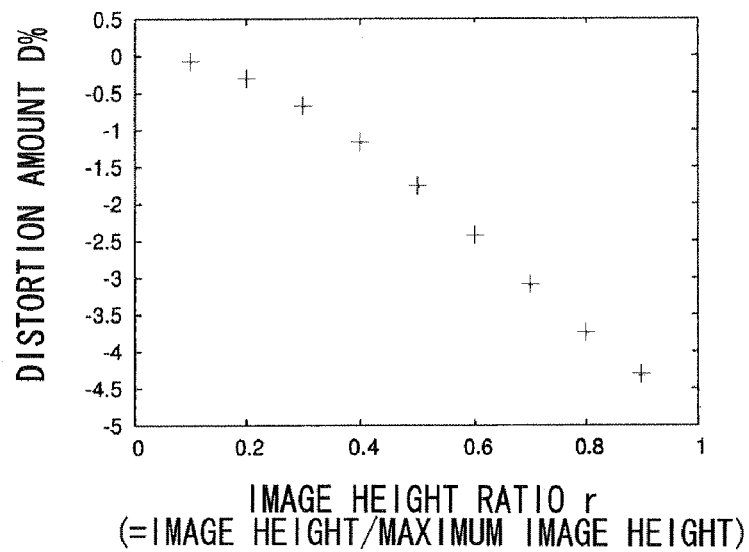

FIG.3

| VALUE OF COEFFICIENT $\Gamma$ | VALUE OF COEFFICIENT $\Delta$ | VALUE OF COEFFICIENT $\Lambda$ |
|---|---|---|
| $\Gamma_{00} = \times\times,$ | $\Delta_{00} = \times\times,$ | $\Lambda_{00} = \times\times,$ |
| $\Gamma_{01} = \times\times,$ | $\Delta_{01} = \times\times,$ | $\Lambda_{01} = \times\times,$ |
| $\Gamma_{02} = \times\times,$ | $\Delta_{02} = \times\times,$ | $\Lambda_{02} = \times\times,$ |
| $\Gamma_{10} = \times\times,$ | $\Delta_{10} = \times\times,$ | $\Lambda_{10} = \times\times,$ |
| $\Gamma_{11} = \times\times,$ | $\Delta_{11} = \times\times,$ | $\Lambda_{11} = \times\times,$ |
| $\Gamma_{12} = \times\times,$ | $\Delta_{12} = \times\times,$ | $\Lambda_{12} = \times\times,$ |
| $\Gamma_{20} = \times\times,$ | $\Delta_{20} = \times\times,$ | $\Lambda_{20} = \times\times,$ |
| $\Gamma_{21} = \times\times,$ | $\Delta_{21} = \times\times,$ | $\Lambda_{21} = \times\times,$ |
| $\Gamma_{22} = \times\times,$ | $\Delta_{22} = \times\times,$ | $\Lambda_{22} = \times\times,$ |
| $\Gamma_{30} = \times\times,$ | $\Delta_{30} = \times\times,$ | $\Lambda_{30} = \times\times,$ |
| $\Gamma_{31} = \times\times,$ | $\Delta_{31} = \times\times,$ | $\Lambda_{31} = \times\times,$ |
| $\Gamma_{32} = \times\times,$ | $\Delta_{32} = \times\times,$ | $\Lambda_{32} = \times\times,$ |

DISTORTION CORRECTING METHOD, DISTORTION CORRECTING DEVICE, PROGRAM RECORDING MEDIUM AND ELECTRONIC CAMERA

CROSS-REFERENCE TO RELATED APPLICATION

This application is a continuation application of International Application No. PCT/JP2007/001445, filed Dec. 20, 2007, designating the U.S., and claims the benefit of priorities from Japanese Patent Application Nos. 2006-353190 and 2006-353191, both filed on Dec. 27, 2006, the entire contents of which are incorporated herein by reference.

BACKGROUND

1. Field

The present application relates to a distortion correcting method applied to image processing software or the like, and a program recording medium recording a distortion correcting program. Further, the present application relates to a distortion correcting device mounted on an electronic camera, a printer with a monitor, image storage or the like. Furthermore, the present application relates to an electronic camera.

2. Description of the Related Art

Since a shooting optical system has a distortion aberration, it generates distortion in images. A distribution of the distortion amount (hereinafter, referred to as "distortion pattern") differs depending on a specification of the shooting optical system, and it differs, even in optical systems of the same specification, depending on lens positions (combination of focal distance and focal position).

Accordingly, in a distortion correcting with the use of an image processing software, it is required that an image to be corrected is displayed on a monitor, and a user manually adjusts a distribution of correction amount (hereinafter, referred to as "distortion correcting pattern") to find out an optimum distortion correcting pattern (refer to Japanese Patent Publication No.3631370, Specification of U.S. Pat. No. 6,323,934, and the like).

However, since the distortion pattern is largely divided into three types of barrel, pin-cushion, and moustache (combined barrel and pin-cushion) patterns, it is not possible to deal with correction only by adjusting a correction level. Among the above, since the moustache distortion pattern is more complicated than the other distortion patterns, even when the distortion correcting pattern is slightly deviated from the optimum distortion correcting pattern, there is a possibility to degrade a distortion of image significantly.

Therefore, it takes time even for a skilled user to find out the optimum distortion correcting pattern, and it is often the case that an unaccustomed user cannot finally find the optimum distortion correcting pattern.

SUMMARY

Accordingly, a proposition of the present application is to provide a distortion correcting method, a distortion correcting device, a program recording medium and an electronic camera which are capable of performing distortion correcting with high accuracy while reducing a labor of a user.

A distortion correcting method according to one aspect includes a preparation operation, a correcting operation, a selection operation and a repeating operation. In the preparation operation, actual measured lens position information obtained by an optical system at a time of shooting an image, an error range in the lens position information, and a relational expression between a distortion pattern given by the optical system to the image and the lens position information, are respectively obtained. In the correcting operation, actual measured data of the lens position information is fit to the relational expression to estimate the distortion pattern of the image shot by the optical system, and distortion correcting is performed on the image at least once or more to obtain one or more temporary corrected images. In the selection operation, a distortion correcting pattern to be applied in main correcting performed on the image is selected based on at least one of the temporary corrected images obtained in the correcting operation. In the repeating operation, when the distortion correcting pattern to be applied in the main correcting is not selected, a value of the actual measured data to be fit to the relational expression in the correcting operation is adjusted within the error range and the correcting operation is repeated.

In the aforementioned one aspect, in the selection operation, a preview display showing one of the temporary corrected images may be performed and the selection may be made based on an input indicating a propriety of the image in the preview display.

In the aforementioned one aspect, in the selection operation, an input for adjusting the value of the actual measured data may also be accepted based on a result of the preview display. Further, in the repeating operation, the value of the actual measured data to be fit to the relational expression in the correcting operation may also be adjusted in accordance with the input for adjusting the value of the actual measured data.

In the aforementioned one aspect, the image to be displayed in the preview display may be an enlarged image of a region of a part of one of the temporary corrected images. Further, the region of the part of one of the temporary corrected images may be designated in accordance with an input from an outside.

In the aforementioned one aspect, in the selection operation, the selection may be made based on an amount of distortion left on one of the temporary corrected images.

In the aforementioned one aspect, the lens position information may include at least either of an actual measured focal position and an actual measured focal distance each being obtained when the optical system performs shooting.

A distortion correcting method according to another aspect includes a preparation operation, a correcting operation, a selection operation and a repeating operation. In the preparation operation, a relation between a distortion pattern given by an optical system to an image and lens position information on the optical system is obtained, as distortion pattern information approximated through a function using shooting condition information set in the optical system. In the correcting operation, actual measured data of the optical system at a time of shooting the image included in the lens position information is fit to the relation to estimate the distortion pattern of the image shot by the optical system, and distortion correcting is performed on the image at least once or more to obtain one or more temporary corrected images. In the selection operation, a distortion correcting pattern to be applied in main correcting performed on the image is selected based on at least one of the temporary corrected images obtained in the correcting operation. In the repeating operation, when the distortion correcting pattern to be applied in the main correcting is not selected, a value of the actual measured data to be fit in the correcting operation is adjusted and the correcting operation is repeated.

Note that the distortion correcting method according to the aforementioned one aspect or another aspect represented as a distortion correcting device, a program for causing a computer to execute the distortion correcting method according to the aforementioned one aspect or another aspect and a program recording medium, and an electronic camera provided with the aforementioned distortion correcting device are also effective as concrete aspects of the present application.

BRIEF DESCRIPTION OF THE DRAWINGS

FIG. 3 is a view showing a distortion pattern of a certain shooting lens.

FIG. 4 is an explanatory view of coefficient information.

DETAILED DESCRIPTION OF THE EMBODIMENTS

[First Embodiment]

A first embodiment will be described. The present embodiment is an embodiment of a camera system. First, a configuration of the present system will be described.

Figures 1, 2A, 2B:
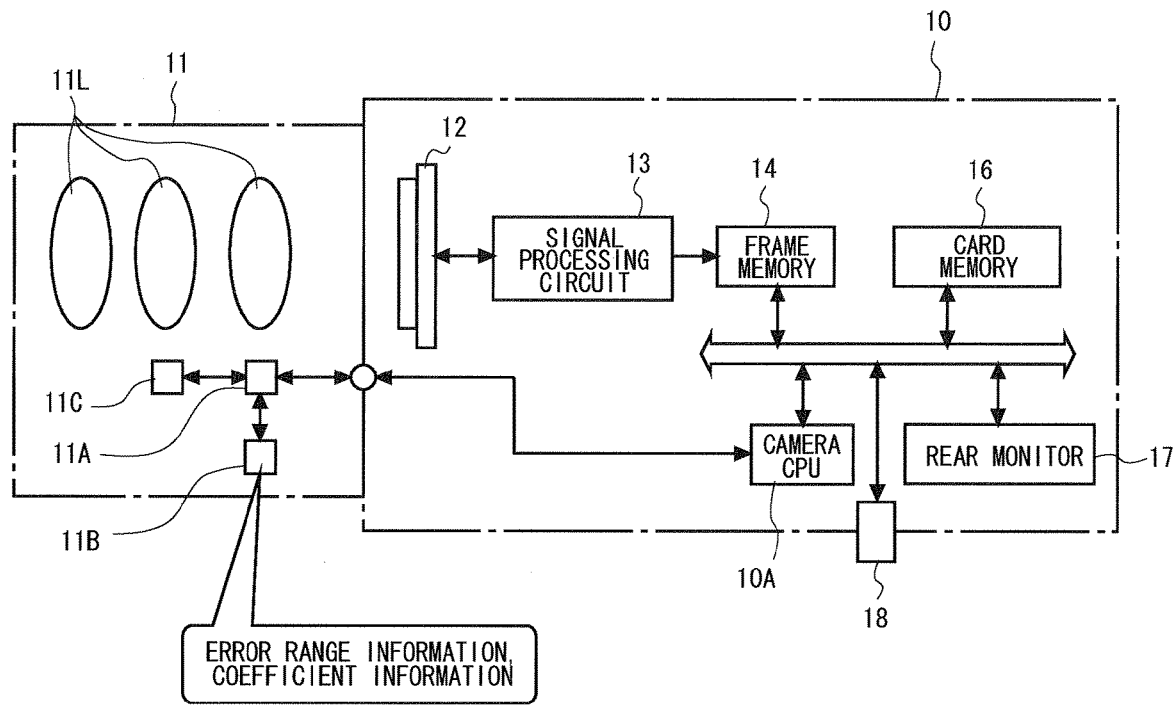
FIG. 1 is a configuration diagram of the present system.
FIG. 2A is a view showing error range information on focal position data "d"
FIG. 2B is a view showing error range information on focal distance data "f".

FIG. 1 is a configuration diagram of the present system. As shown in FIG. 1, the present system is formed of an interchangeable lens 11 and a camera body 10.

In the interchangeable lens 11, shooting lenses 11L whose lens positions (combination of focal position d and focal distance f) are variable, a lens CPU 11A, a ROM 11B, an encoder 11C and the like are included. The camera body 10 is provided with a camera CPU 10A, an image sensor 12, a signal processing circuit 13, a flame memory 14, a card memory 16, a rear monitor 17, an operation button 18 and the like.

The shooting lens 11L of the interchangeable lens 11 forms an image of a subject on the imaging element 12. The image of the subject is converted into an image signal by the imaging element 12. The image signal is processed in the signal processing circuit 13, and thereafter, it is accumulated in the flame memory 14. The camera CPU 10A performs image processing on the image signal (hereinafter, referred to as "image") for one frame accumulated in the frame memory 14, and then forms an image file of the image to store it in the card memory 16.

The encoder 11C of the interchangeable lens 11 detects a lens position of the shooting lens 11L to generate lens position data. The lens position data is formed of focal position data "d" made by digitizing the focal position d of the shooting lens 11L and focal distance data "f" made by digitizing the focal distance f of the shooting lens 11L. The lens CPU 11A communicates with the camera CPU 10A, and reads, in accordance with a request from the camera CPU 10A, the focal position data "d" and the focal distance data "f" generated by the encoder 11C to transmit them to the camera CPU 10A.

The ROM 11B of the interchangeable lens 11 stores error range information and coefficient information accompanying the interchangeable lens 11. Each of the error range information and the coefficient information is determined depending on a specification of the interchangeable lens 11, and is previously prepared for each type of the interchangeable lens 11. The description regarding these pieces of information will be given later. The lens CPU 11A communicates with the camera CPU 10A, and reads, in accordance with a request from the camera CPU 10A, the error range information and the coefficient information from the ROM 11B to transmit them to the camera CPU 10A.

Note that a user of the present system operates the operation button 18 of the camera body 10, to thereby input various types of instructions such as a mode switching, into the camera CPU 10A. For example, when the camera body 10 is in a shooting mode, the user can give a shooting instruction of an image to the camera CPU 10A at any timing. Further, when the camera body 10 is in a reproducing mode, the user can give a reproducing instruction of an image file stored in the card memory 16 to the camera CPU 10A. At this time, the camera CPU 10A reproduces and displays, on the rear monitor 17, an image (image for display) formed by reducing resolution of the image stored in the image file (image for storage).

Further, when the image is reproduced and displayed on the rear monitor 17, the user can input, into the camera body 10, an instruction of distortion correcting with respect to the image being reproduced and displayed. Detailed explanation of the distortion correcting will be given later.

Next, the error range information stored in the ROM 11B will be described. FIG. 2A and FIG. 2B are views for explaining the error range information. As shown in FIG. 2A and FIG. 2B, in the error range information, there are error range information on the focal position data "d" and error range information on the focal distance data "f".

Normally, a true value of the focal position d set in the shooting lens 11L takes continuous values. On the contrary, the focal position data "d", namely, a reading of the focal position d takes discontinuous values such as 0.3 m, 0.5 m, 1 m, and so on. Accordingly, the focal position data "d" may include a measurement error. What indicates an error range (range of true value) of the focal position data "d" is the error range information on the focal position data "d".

However, an interval between values of the focal position data "d" is not constant in the normal shooting lens 11L, so that an extent of the error range varies depending on the value of the focal position data "d". Accordingly, the error range is prepared for each value of the focal position data "d", as shown in FIG. 2A.

Further, a true value of the focal distance f set in the shooting lens 11L normally takes continuous values. On the contrary, the focal distance data "f", namely, a reading of the focal distance f takes discontinuous values such as 10.5 mm, 12 mm, and so on. Accordingly, the focal distance data "f" may include a measurement error. What indicates an error range (range of true value) of the focal distance data "f" is the error range information on the focal distance data "f".

However, an interval between values of the focal distance data "f" is not constant in the normal shooting lens 11L, so that an extent of the error range varies depending on the value of the focal distance data "f". Accordingly, the error range is prepared for each value of the focal distance data "f", as shown in FIG. 2B.

Next, the coefficient information stored in the ROM 11B will be described. Normally, a distortion amount D given by the shooting lens 11L to an image is represented by a function D(r) of an image height ratio r (=image height/maximum image height), as shown in FIG. 3. The function D(r) indicates a distortion pattern. The distortion pattern D(r) is represented by, for example, an expression (1).

$$D = D(r) \equiv Ar^4 + Br^3 + Cr^2 \quad (1)$$

However, when the lens position (d, f) of the shooting lens 11L is changed, a coefficient A in the expression (1) is also changed. In other words, the coefficient A is a function of the lens position (d, f), and is represented by, for example, the following expression (2).

$$A = A(f, d) \equiv \sum_{i=0}^{2}\sum_{j=0}^{2} \Gamma_{ij}\left(\frac{1}{f}\right)^i\left(\frac{1}{d}\right)^j + \sum_{j=0}^{2}\sqrt{\frac{1}{f}}\left(\frac{1}{d}\right)^j \Gamma_{3j} \quad (2)$$

Further, when the lens position (d, f) of the shooting lens 11L is changed, a coefficient B in the expression (1) is also changed. In other words, the coefficient B is a function of the lens position (d, f), and is represented by, for example, the following expression (3).

$$B = B(f, d) \equiv \sum_{i=0}^{2}\sum_{j=0}^{2} \Delta_{ij}\left(\frac{1}{f}\right)^i\left(\frac{1}{d}\right)^j + \sum_{j=0}^{2}\sqrt{\frac{1}{f}}\left(\frac{1}{d}\right)^j \Delta_{3j} \quad (3)$$

Further, when the lens position (d, f) of the shooting lens 11L is changed, a coefficient C in the expression (1) is also changed. In other words, the coefficient C is a function of the lens position (d, f), and is represented by, for example, the following expression (4).

$$C = C(f, d) \equiv \sum_{i=0}^{2}\sum_{j=0}^{2} \Lambda_{ij}\left(\frac{1}{f}\right)^i\left(\frac{1}{d}\right)^j + \sum_{j=0}^{2}\sqrt{\frac{1}{f}}\left(\frac{1}{d}\right)^j \Lambda_{3j} \quad (4)$$

Further, values of 12 coefficients $\Gamma_{00}, \Gamma_{01}, \Gamma_{02}, \Gamma_{10}, \Gamma_{11}, \Gamma_{12}, \Gamma_{20}, \Gamma_{21}, \Gamma_{22}, \Gamma_{30}, \Gamma_{31}$ and $\Gamma_{32}$ in the expression (2), 12 coefficients $\Delta_{00}, \Delta_{01}, \Delta_{02}, \Delta_{10}, \Delta_{11}, \Delta_{12}, \Delta_{20}, \Delta_{21}, \Delta_{22}, \Delta_{30}, \Delta_{31}$ and $\Delta_{32}$ in the expression (3), and 12 coefficients $\Lambda_{00}, \Lambda_{01}, \Lambda_{02}, \Lambda_{10}, \Lambda_{11}, \Lambda_{12}, \Lambda_{20}, \Lambda_{21}, \Lambda_{22}, \Lambda_{30}, \Lambda_{31}$ and $\Lambda_{32}$ in the expression (4) are determined depending on a specification of the shooting lens 11L.

What indicates the values of these coefficients (36 coefficients in total) is the coefficient information. If the coefficient information is visualized, it is expressed as shown in FIG. 4.

Note that the expressions (1) to (4) are previously stored by the camera CPU 10A.

The camera CPU 10A may store the expressions (1) to (4) separately, or may store only one expression formed by substituting the expressions (2) to (4) into the expression (1). Further, the number of coefficients is 36 in this case, but, it may take a number other than 36 depending on a combination of the number of terms r in the expression (1), the number of terms d and the number of terms f in the expressions (2) to (4).

Next, uses of the focal position data "d", the focal distance data "f", the coefficient information, and the expressions (1) to (4) will be described.

When the camera CPU 10A reads the coefficient information (values of 36 coefficients) from the interchangeable lens 11 and fits it to the expressions (1) to (4), a relational expression D(r)=D(r, d, f) between the distortion pattern D(r) occurred in the image and the lens position (d, f) of the shooting lens 11L is obtained.

Accordingly, when the camera CPU 10A reads the focal position data "d" and the focal distance data "f" from the interchangeable lens 11 and fits them to the relational expression D(r)=D(r, d, f), it is possible to estimate the distortion pattern D(r) occurred in the image.

However, as described above, there is a possibility that each of the focal position data "d" and the focal distance data "f" includes the measurement error, so that this estimation may generate an estimation error.

Figure 5:
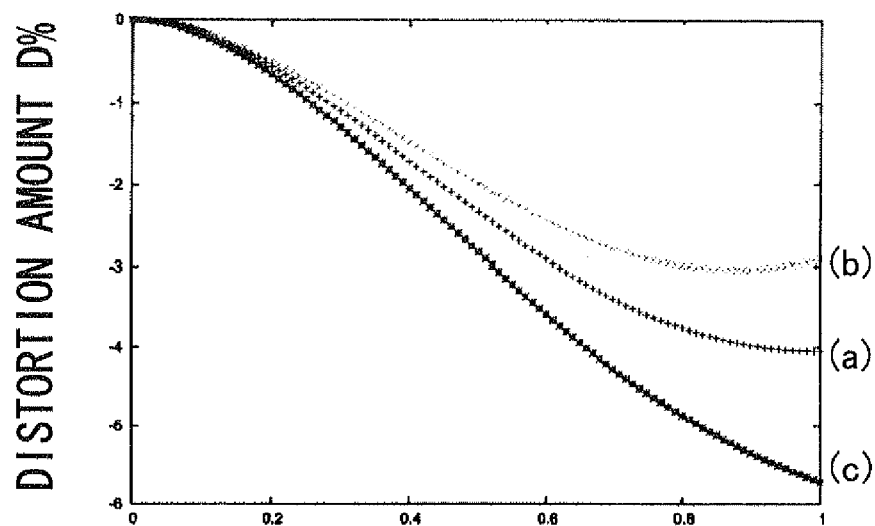
FIG. 5 is a view showing distortion aberration data that explains a degree of estimation error (wide angle side).

What is shown in FIG. 5 is distortion aberration data that explains a degree of estimation error. A true value of the focal distance f of a certain shooting lens is varied in three ways within a range (=within an error range) in which a reading of the focal distance f (=focal distance data "f") becomes invariable. The three ways of distortion patterns occurred in images at that time are shown in FIG. 5(a), FIG. 5(b) and FIG. 5(c).

FIG. 5(a) illustrates a distortion pattern when the true value of the focal distance f matches the reading of the focal distance f, and FIGS. 5(b) and 5(c) illustrate distortion patterns when the true value of the focal distance f matches both ends of the error range.

As above, even when the reading of the focal distance f is the same, when the true value of the focal distance f is different, the distortion pattern differs significantly. For this reason, a large estimation error may be generated in the aforementioned estimation. A difference between (a) and (b), or a difference between (a) and (c) corresponds to the degree of measurement error.

Figure 6:
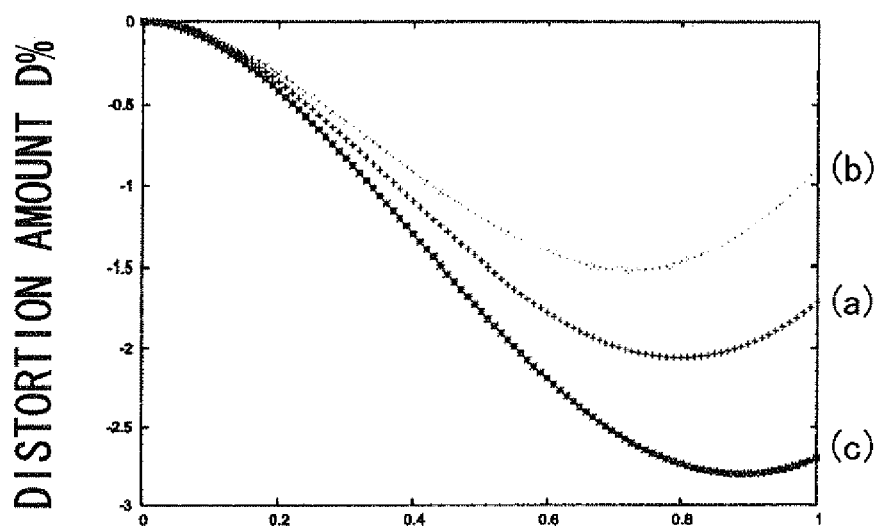
FIG. 6 is a view showing distortion aberration data that explains a degree of estimation error (telephoto side).

Note that the distortion aberration data shown in FIG. 5 is distortion aberration data in a lens position of a certain shooting lens at its wide angle side. Distortion aberration data of the same shooting lens at its telephoto side is as shown in FIG. 6. It can be confirmed, from FIG. 6, that a large estimation error may be generated also at the telephoto side.

Further, only the estimation error caused by the measurement error of the focal distance data "f" is explained here, but, an estimation error caused by a measurement error of the focal position data "d" is also occurred to some degree, although it is not so large as the estimation error caused by the measurement error of the focal distance data "f".

Figure 7:
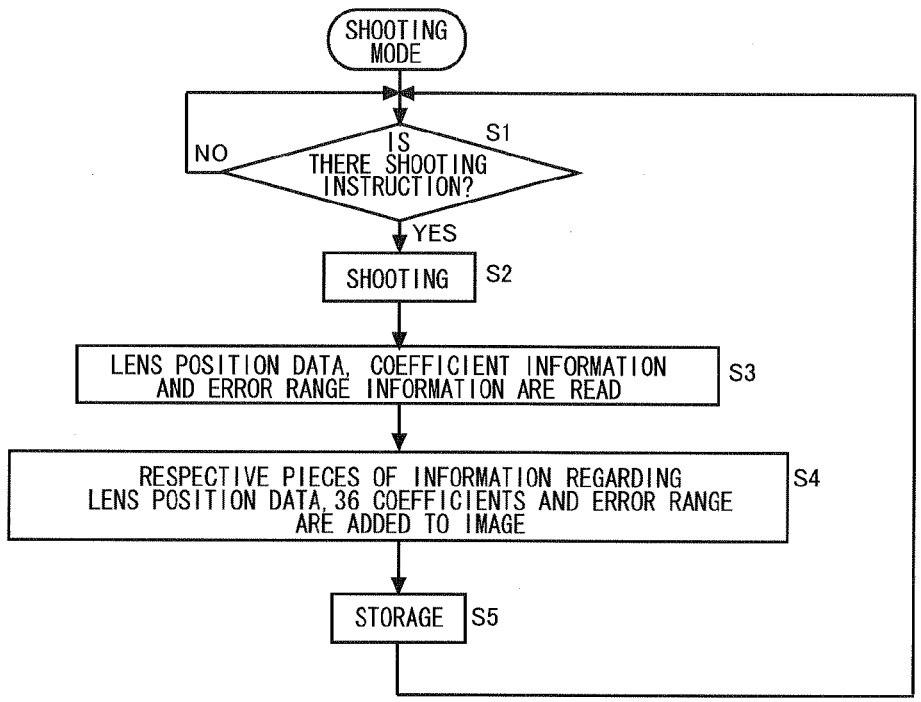
FIG. 7 is an operation flow chart of a camera CPU 10A when a camera body 10 is in a shooting mode.

Next, an operation of the camera CPU 10A when the camera body 10 is in the shooting mode will be explained. FIG. 7 is an operation flow chart of the camera CPU 10A when the camera body 10 is in the shooting mode. As shown in FIG. 7, when the camera CPU 10A recognizes a shooting instruction from a user when the camera body 10 is in the shooting mode (YES in step S1), the camera CPU 10A drives the imaging element 12 and the signal processing circuit 13 to perform shooting, and obtains an image (step S2).

At this timing, the camera CPU 10A reads the focal position data "d", the focal distance data "f", the error range information and the coefficient information from the interchangeable lens 11 (step S3).

Figure 8:
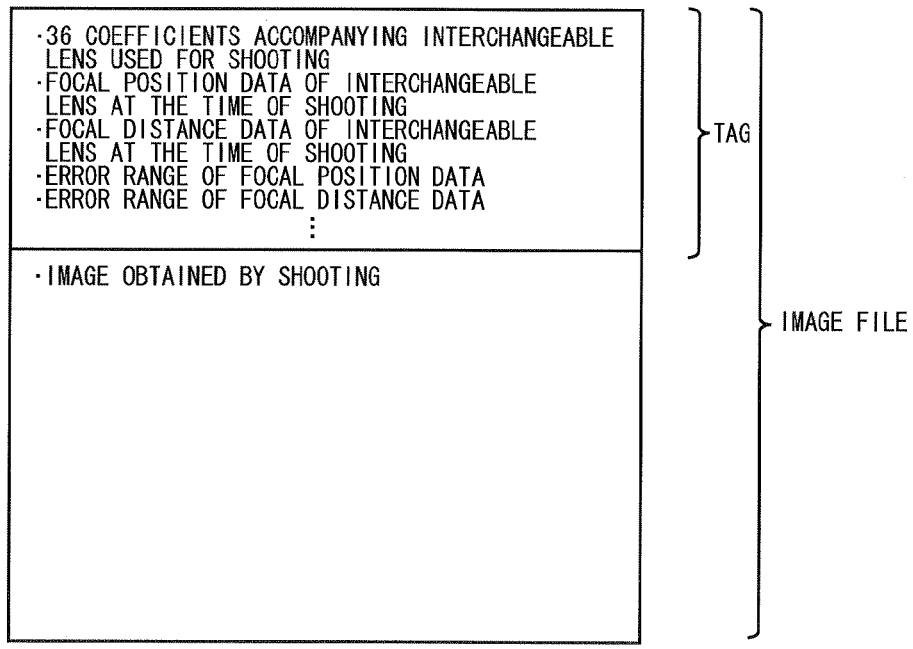
FIG. 8 is a view showing a configuration of an image file.

Subsequently, the camera CPU 10A forms an image file of the image obtained in step S2 (step S4). In step S4, the camera CPU 10A recognizes, based on the read error range information, the read focal position data "d" and the read focal distance data "f", each of an error range of the focal position data "d" and an error range of the focal distance data "f". For example, when a value of the focal position data "d" is 0.3 m, and a value of the focal distance data "f" is 10.5 mm, the error range of the focal position data "d" is recognized to be (0.3 m to 0.35 m), and the error range of the focal distance data "f" is recognized to be (10 mm to 11 mm), as shown in FIG. 2. Further, the camera CPU 10A writes information regarding the recognized error ranges into a tag of the image file together with the read coefficient information, the focal position data "d", and the read focal distance data "f". In this case, a configuration of the image file becomes as shown in FIG. 8.

Subsequently, the camera CPU 10A stores the image file formed in step S3 in the card memory 16 (step S5).

The processing of the above-described steps S2 to S5 is carried out each time the shooting instruction is input (each time it becomes YES in step S1). Accordingly, when the shooting instruction is input at a plurality of times during the shooting mode, a plurality of images are obtained. To each of those images, respective pieces of information regarding the 36 coefficients for the interchangeable lens 11 used for shooting the image, the focal position data "d" of the interchangeable lens 11 at the time of shooting, the focal distance data "f" of the interchangeable lens 11 at the time of shooting, the error range of the focal position data "d", and the error range of the focal distance data "f", are added.

Note that a timing at which the error range information and the coefficient information are read from the interchangeable lens 11 is set to correspond to a timing at which the shooting is performed in the flow chart shown in FIG. 7, but, it may be set to correspond to a timing at which the lens is interchanged, since these pieces of information are peculiar to the interchangeable lens 11. Further, each of the error range information and the coefficient information on the interchangeable lens may be previously stored in the camera body 10. Note that in this case, information regarding the 36 coefficients and the error ranges of f and d in FIG. 8 is not necessarily added to the image file.

Next, an operation of the camera CPU 10A regarding the distortion correcting in the first embodiment will be described.

Figure 9:
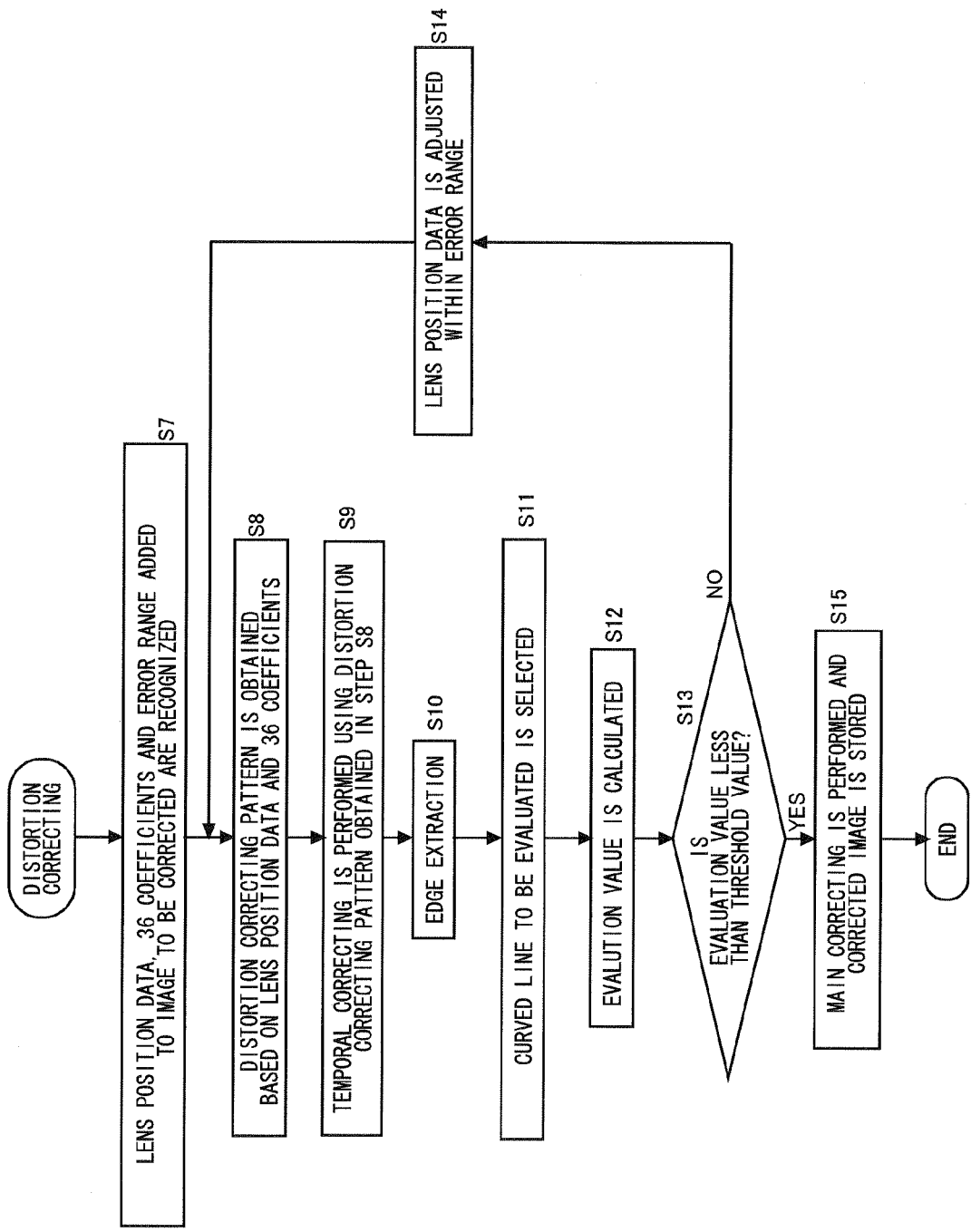
FIG. 9 is an operation flow chart of the camera CPU 10A when an instruction of distortion correcting is input in a first embodiment.

FIG. 9 is an operation flow chart of the camera CPU 10A when the instruction of distortion correcting is input in the first embodiment. As shown in FIG. 9, when the instruction of distortion correcting is input during when a certain image is reproduced and displayed on the rear monitor 17, the camera CPU 10A refers to an image file of the image (hereinafter, referred to as "image to be corrected"). Subsequently, the camera CPU 10A recognizes 36 coefficients, focal position data "d", focal distance data "f", an error range of the focal position data "d" and an error range of the focal distance data "f" added to the image to be corrected, respectively (step S7).

The camera CPU 10A fits values of the recognized 36 coefficients to the expressions (1) to (4) to obtain a relational expression D(r)=D (r, d, f), and fits the recognized focal position data "d" and the focal distance data "f" to the relational expression D(r)=D (r, d, f), to thereby estimate a distortion pattern D(r) of the image to be corrected. Accordingly, a distortion correcting pattern D'(r) for correcting the image to be corrected is obtained (step S8).

Further, the camera CPU 10A performs temporal distortion correcting (temporal correcting) on the image to be corrected using the distortion correcting pattern D'(r) obtained in step S8 (step S9). Here, "temporal correcting" may correspond not only to the distortion correcting with respect to the image to be corrected for storage, but also to the distortion correcting with respect an image which is formed by reducing resolution of the image to be corrected for storage. The temporal correcting is performed in a relatively short period of time.

Figure 10A:
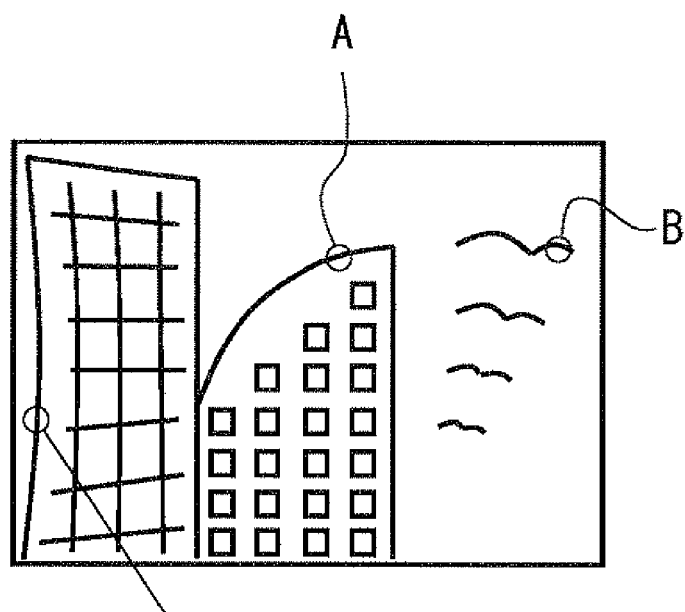
FIGS. 10A to 10C are views for explaining steps S10 to S12.

Further, the camera CPU 10A performs edge extraction processing on the temporary-corrected image to be corrected, to thereby obtain an edge image (step S10). An example of the obtained edge image is shown in FIG. 10A. The edge image is obtained after the temporal correcting, so that the distortion caused by the distortion aberration of the shooting lens 11L is suppressed, not completely, but to some extent.

Accordingly, a linear contour of a subject such as a building appears as a curved line close to a straight line in the edge image (however, for easier understanding, the distortion is emphasized more than the actual distortion in the drawing). A deviation amount of the curved line from the straight line indicates the estimation error at the time of estimation in step S8 (namely, a correction error at the time of temporal correcting in step S9).

Therefore, the camera CPU 10A selects, among a plurality of continuous curved lines existing in the edge image, one curved line to be evaluated that satisfies the following conditions (step S11).

The camera CPU 10A sets a line that satisfies "sufficiently small deviation amount from the straight line" and "sufficiently large whole length of curved line", among lines that do not pass through a center of the image to be corrected, as the curved line to be evaluated.

As an example, the camera CPU 10A sets lines included in the edge image except lines passing through the center of the image to be corrected, as candidates for the curved line to be evaluated. Next, the camera CPU 10A narrows down the aforementioned candidates for the curved line to be evaluated to a certain number (five, for example) in order from the line having a larger length. Subsequently, the camera CPU 10A sets, among the remaining candidates for the curved line to be evaluated, the one with the smallest deviation amount from the straight line as the curved line to be evaluated. Note that it is also possible that the camera CPU 10A narrows down the candidates for the curved line to be evaluated based on "smallness of the deviation amount from the straight line", and sets the longest line among the remaining candidates for the curved line to be evaluated, as the curved line to be evaluated.

Figure 10B:
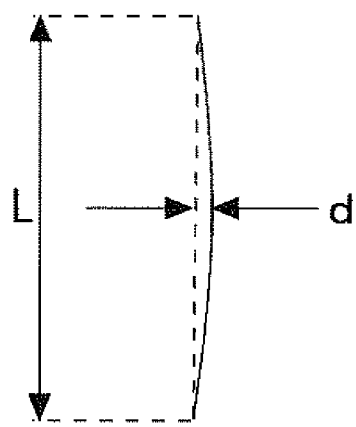

At this time, a curved line as shown in FIG. 10B is selected as the curved line to be evaluated. Incidentally, distortions of curved lines indicated by reference letters A and B in FIG. 10A are not caused by the distortion aberration of the shooting lens 11L, so that a deviation amount from the straight line is large. Accordingly, the curved lines A and B do not satisfy the aforementioned conditions, and thus are never selected as the curved line to be evaluated.

Figure 10C:

Further, the camera CPU 10A calculates an evaluation value E indicating the correction error in the temporal correcting based on the selected curved line to be evaluated (step S12). For example, as shown in FIG. 10C, the evaluation value E is calculated using an expression of E=d/L, in which a whole length of the curved line to be evaluated is L and a bulge amount of the curved line to be evaluated is d.

Subsequently, the camera CPU 10A compares the calculated evaluation value E with a threshold value, and if the evaluation value E is not less than the threshold value (NO in step S13), it adjusts the combination of values of the focal position data "d" and the focal distance data "f" (step S14), and returns to step S8.

In step S8 of the second time, the camera CPU 10A obtains the distortion correcting pattern D'(r) again by using the adjusted focal distance data "f" and the adjusted focal position data "d". In the following step S9, the camera CPU 10A performs the temporal correcting on the image to be corrected (which is the image to be corrected to which the temporal correcting is not yet performed) by using the obtained distortion correcting pattern D'(r). Subsequently, the camera CPU 10A executes steps S10, S11 and S12 to calculate the evaluation value E.

Further, the camera CPU 10A repeats a loop of step S14, step S8, step S9, step S10, step S11, step S12 and step S13 until the evaluation value E calculated in step S12 becomes less than the threshold value (until it becomes YES in step S13).

Note that in step S14 of the loop, the camera CPU 10A regulates an adjustment range of the value of the focal position data "d" so that the range becomes the same as the error range of the focal position data "d". Further, the camera CPU 10A regulates an adjustment range of the value of the focal distance data "f" so that the range becomes the same as the error range of the focal distance data "f".

Further, an adjustment amount for one time of the focal position data "d" is set to an amount in which the error range is divided equally into five, for instance. In addition, an adjustment amount for one time of the focal distance data "f" is set to an amount in which the error range is divided equally into five, for instance. In this case, the maximum number of adjustments of the focal position data "d" becomes "6", and the maximum number of adjustments of the focal distance data "f" also becomes "6". Accordingly, the maximum number of repetitions of the loop becomes 36 obtained by multiplying 6 by 6.

Now, when the evaluation value E becomes less than the threshold value (YES in step S13), the camera CPU 10A selects the distortion correcting pattern D'(r) used at the time of the last temporal correcting as an actual distortion correcting (main correcting) pattern. The camera CPU 10A newly forms an image file of the image to which the main correcting is performed, and then stores it in the card memory 16 (step S15). Note that "main correcting" indicates the distortion correcting with respect to the image to be corrected for storage.

As described above, the present system repeats the temporal correcting while changing the distortion correcting patterns, and what are adjusted at that time are not the distortion correcting patterns themselves but the focal distance data "f" or the focal position data "d" used at the time of calculating the distortion correcting patterns. In this case, the distortion correcting pattern of the image to be corrected is changed only in the vicinity of the optimum distortion correcting pattern. Therefore, the present system can surely find out, among the plurality of images to be corrected which are temporally corrected, the one whose distortion is favorably corrected.

Besides, in the present system, since the adjustment range of the focal distance data "f" covers the error range of the focal distance data "f", and the adjustment range of the focal position data "d" covers the error range of the focal position data "d", although the adjustment ranges are limited to narrow ranges, there is no possibility that the optimum distortion correcting pattern is out of the candidates.

Therefore, according to the present system, it is possible to conduct the distortion correcting with high accuracy while saving labor to a user.

Further, in the aforementioned distortion correcting mode, a case is assumed in which the focal distance data "f" and the focal position data "d" were given, but, when the pieces of data were not given (when the lens position data was not added to the image to be corrected), it is only required to perform as follows.

Specifically, the camera CPU 10A widely sets the adjustment range of the focal distance data "f" and the adjustment range of the focal position data "d", respectively. The adjustment range of the focal distance data "f" is set to be a total range of the focal distance capable of being set in the shooting lens, and the adjustment range of the focal position data "d" is set to be a total range of the focal position capable of being set in the shooting lens. For example, the adjustment amount for one time of the focal position data "d" is set to an amount in which the total range of the focal position is divided equally into nine, and the adjustment amount for one time of the focal distance data "f" is set to an amount in which the total range of the focal distance is divided equally into nine. In that case, the maximum number of adjustments of the focal position data "d" becomes "10", and the maximum number of adjustments of the focal distance data "f" becomes "10". Accordingly, the maximum number of repetitions of the loop becomes 100 obtained by multiplying 10 by 10.

Further, although the camera CPU 10A of the present system calculates the evaluation value E while changing the combinations of the values of the focal distance data "f" and the focal position data "d" little by little, terminates the loop when the evaluation value E becomes less than the threshold value, and uses the distortion correcting pattern D'(r) used at the time of the last temporal correcting for the main correcting, it is also possible to perform as follows.

Specifically, the camera CPU 10A calculates the evaluation value E while changing the combinations of the values of the focal distance data "f" and the focal position data "d" to all combinations, and uses the distortion correcting pattern D'(r) used at the temporal correcting in which the evaluation value E takes the smallest value, for the main correcting.

Further, it is also possible that the camera CPU 10A of the present system displays, each time the temporal correcting is performed during the execution of the loop, the temporally-corrected image to be corrected on the rear monitor 17. If it is performed as above, a progress of distortion correcting processing can be indicated to the user during a waiting time of the distortion correcting processing.

[Second Embodiment]

Next, an operation of the camera CPU 10A when the camera body 10 shifts from the reproducing mode to the distortion correcting mode will be described as a second embodiment.

When an image is reproduced and displayed on the rear monitor 17, the user can give a shift instruction from the reproducing mode to the distortion correcting mode to the camera CPU 10A. Under this state, the user can input, into the camera body 10, the instruction of distortion correcting with respect to the image being reproduced and displayed.

Figure 11:
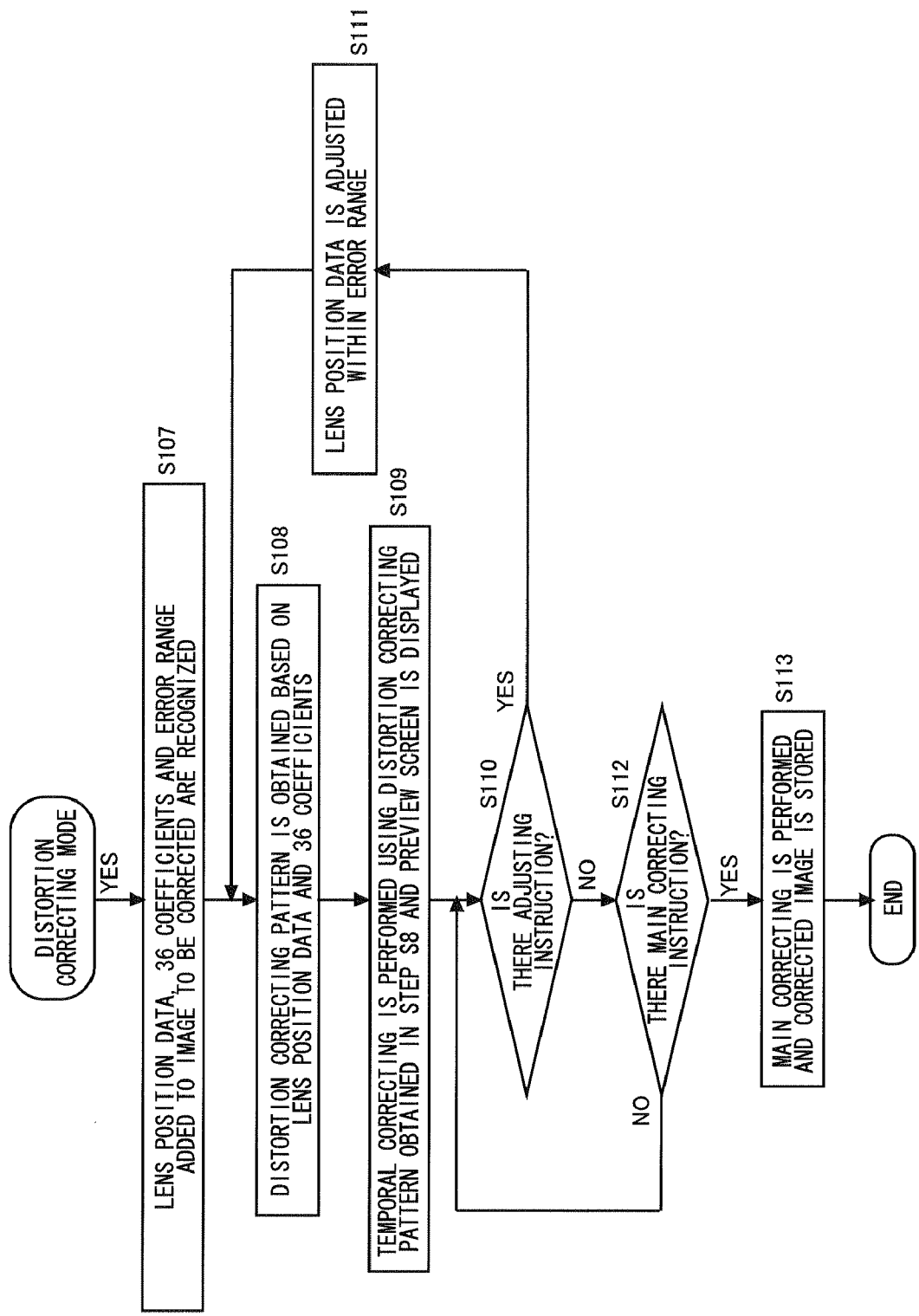
FIG. 11 is an operation flow chart of the camera CPU 10A when the camera body 10 shifts from a reproducing mode to a distortion correcting mode.

FIG. 11 is an operation flow chart of the camera CPU 10A when the camera body 10 shifts from the reproducing mode to the distortion correcting mode. As shown in FIG. 11, when the camera body 10 shifts to the distortion correcting mode during when a certain image is reproduced and displayed on the rear monitor 17, the camera CPU 10A refers to an image file of the image (hereinafter, referred to as "image to be corrected"). Subsequently, the camera CPU 10A recognizes 36 coefficients, focal position data "d", focal distance data "f", an error range of the focal position data "d" and an error range of the focal distance data "f" added to the image to be corrected, respectively (step S107).

The camera CPU 10A fits values of the recognized 36 coefficients to the expressions (1) to (4) to obtain a relational expression D(r)=D (r, d, f), and fits the recognized focal position data "d" and the focal distance data "f" to the relational expression D(r)=D (r, d, f), to thereby estimate a distortion pattern D(r) of the image to be corrected. Accordingly, a distortion correcting pattern D'(r) for correcting the image to be corrected is obtained (step S108).

Further, the camera CPU 10A performs temporal distortion correcting (temporal correcting) on the image to be corrected using the distortion correcting pattern D'(r) obtained in step S108 and displays a preview screen on the rear monitor 17 (step S109). Here, "temporal correcting" indicates, not the distortion correcting with respect to the image to be corrected for storage, but the distortion correcting with respect the image to be corrected for display. The image for display has a lower resolution than the image for storage, so that the temporal correcting is performed in a relatively short period of time.

Figure 12:
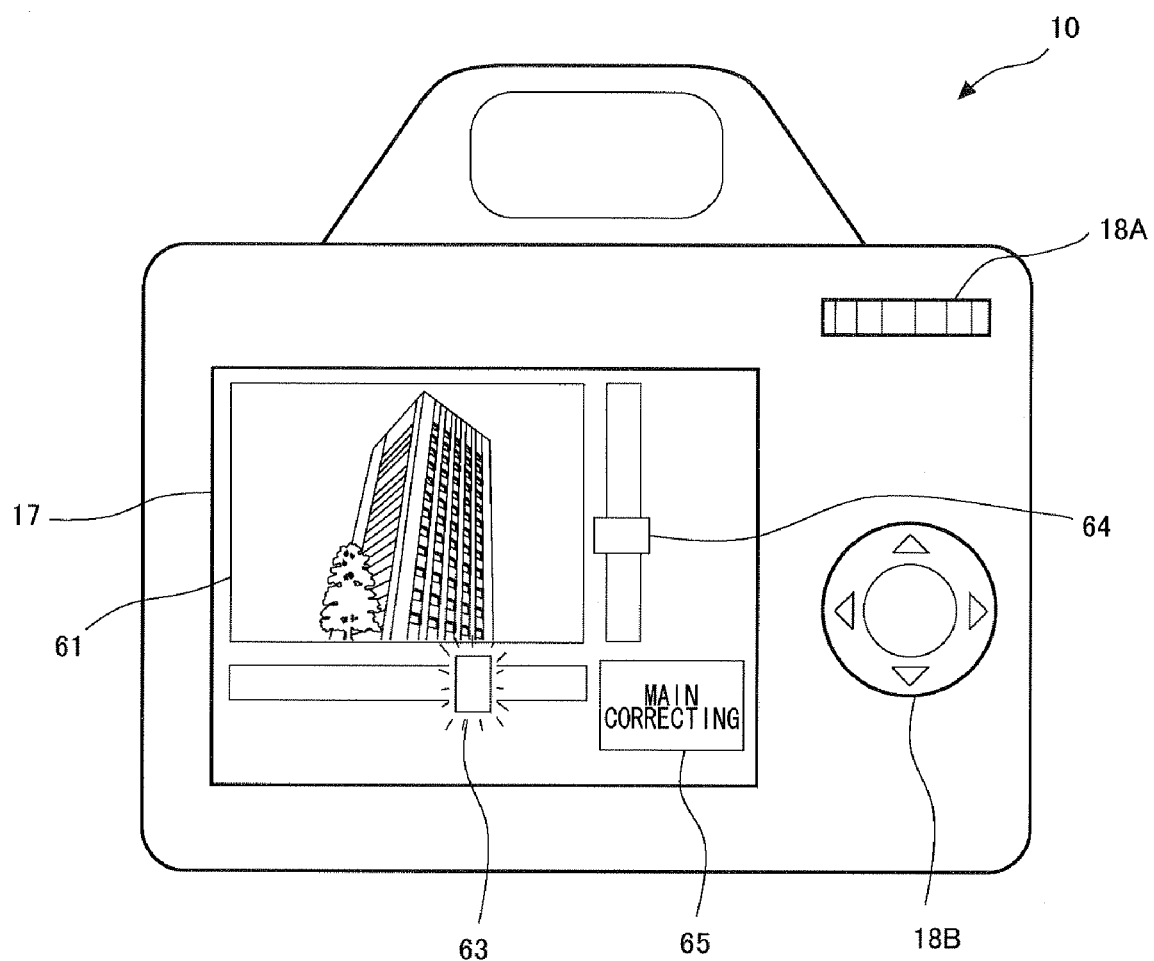
FIG. 12 is a view in which the camera body 10 is viewed from a rear surface side thereof.

FIG. 12 is a view in which the camera body 10 at this time is viewed from a rear surface side thereof. What is denoted by a reference numeral 17 is the rear monitor. A reference numeral 18A denotes a command dial (one kind of operation button). A reference numeral 18B denotes a multi-selector (one kind of operation button).

The preview screen is displayed on the rear monitor 17. On a display region 61 being a part of the preview screen, the temporary-corrected image to be corrected is disposed, and a GUI image such as an adjusting bar 63, an adjusting bar 64 and a main correcting button 65, is disposed on the other region of the preview screen.

Among the above, the adjusting bar 63 is a GUI image used when the user adjusts the value of the focal distance data "f". The adjusting bar 64 is a GUI image used when the user adjusts the value of the focal position data "d". The main correcting button 65 is a GUI image used when the user inputs the instruction of main correcting into the camera CPU 10A.

For example, the user operates the multi-selector 18B in upper, lower, left and right directions to make a cursor on the preview screen jump among the adjusting bars 63 and 64 and the main correcting button 65. In FIG. 12, a state in which the cursor is positioned on the adjusting bar 63 is illustrated.

When the user operates the command dial 18A when the cursor is positioned on the adjusting bar 63, it is possible to shift the adjusting bar 63 within its movable range, and to input an adjusting instruction of the focal distance data "f" into the camera CPU 10A.

Further, when the user operates the command dial 18A when the cursor is positioned on the adjusting bar 64, it is possible to shift the adjusting bar 64 within its movable range, and to input an adjusting instruction and an adjustment amount of the focal position data "d" into the camera CPU 10A.

The camera CPU 10A regards that an adjustment amount (adjustment amount of the focal distance data "f") intended by the user is large as a shift amount of the adjusting bar 63 is increased. However, the camera CPU 10A recognizes the movable range of the adjusting bar 63 by corresponding it to the error range of the focal distance data "f", and regulates the adjustment range of the focal distance data "f" adjusted by the user to be the same as the error range of the focal distance data "f".

Further, the camera CPU 10A regards that an adjustment amount (adjustment amount of the focal position data "d") intended by the user is large as a shift amount of the adjusting bar 64 is increased. However, the camera CPU 10A recognizes the movable range of the adjusting bar 64 by corresponding it to the error range of the focal position data "d", and regulates the adjustment range of the focal position data "d" adjusted by the user to be the same as the error range of the focal position data "d".

When the adjusting instruction of the focal distance data "f" or the focal position data "d" is input (YES in step S110), the camera CPU 10A follows the instruction to adjust the value of the focal distance data "f" or the focal position data "d" (step S111), and returns to step S108.

In step S108 of the second time, the camera CPU 10A obtains the distortion correcting pattern D'(r) again by using the adjusted focal distance data "f" and the adjusted focal position data "d". In the following step S109, the camera CPU 10A performs the temporal correcting on the image to be corrected (which is the image to be corrected to which the temporal correcting is not yet performed) by using the obtained distortion correcting pattern D'(r), and displays a preview screen on the rear monitor 17.

Further, the camera CPU 10A repeats a loop of step S108, step S109, step S110 and step S111 each time the adjusting instruction of the focal distance data "f" or the focal position data "d" is input (YES in step S110).

The loop is performed at a high speed, so that on the preview screen, a distortion pattern of the image to be corrected displayed on the display region 61 is changed in real time in accordance with the shifts of the adjusting bars 63 and 64. Accordingly, the user is only required to shift the adjusting bars 63 and 64 little by little, until he or she is satisfied with the displayed image to be corrected.

When the user is satisfied with the image to be corrected, he or she makes the cursor jump to the main correcting button 65 and presses a decision button of the multi-selector 18B. Accordingly, the main correcting button 65 is selected, and the instruction of main correcting is input into the camera CPU 10A.

When the instruction of main correcting is input (YES in step S112), the camera CPU 10A performs actual distortion correcting (main correcting) on the image to be corrected using the distortion correcting pattern D'(r) used at the time of the last temporal correcting, and newly forms an image file of the image to which the main correcting is performed to store it in the card memory 16 (step S113). Here, "main correcting" indicates the distortion correcting with respect to the image to be corrected for storage.

As described above, the distortion correcting patterns are adjusted by the user on the preview screen, and what are adjusted at that time are, also in the present system, not the distortion correcting patterns themselves but the focal distance data "f" or the focal position data "d" used at the time of calculating the distortion correcting patterns. In this case, the distortion correcting pattern of the image to be corrected is changed only in the vicinity of the optimum distortion correcting pattern. Therefore, the user can easily find out, among the plurality of images to be corrected which are temporally corrected, the one whose distortion is favorably corrected.

Besides, in the present system, since the adjustment range of the focal distance data "f" covers the error range of the focal distance data "f", and the adjustment range of the focal position data "d" covers the error range of the focal position data "d", although the adjustment ranges are limited to narrow ranges, there is no possibility that the optimum distortion correcting pattern is out of candidates.

Therefore, according to the present system, it is possible to conduct the distortion correcting with high accuracy while reducing labor to a user.

Further, in the present system, the shift amount of the adjusting bar 63 corresponds, not to an adjustment amount of the distortion correcting pattern, but to an adjustment amount of the focal distance data "f". Accordingly, when the adjusting bar 63 shifts from left to right, the distortion correcting pattern of a certain image may be altered from the barrel pattern to the pin-cushion pattern and meanwhile, the distortion correcting pattern of another image may be altered from the pin-cushion pattern to the barrel pattern. As above, if the alteration directions of the distortion correcting patterns are reversed depending on images, the user may be confused. Therefore, it is preferable that the camera CPU 10A of the present system appropriately reverses the relationship between a shift direction of the adjusting bar 63 and an adjustment direction of the focal distance data "f" depending on images, so that the alteration directions of the distortion correcting patterns match without depending on the images. Note that the presence/absence of necessity of reversal may be determined by the camera CPU 10A for each image based on the contents of the relational expression $D(r)=D(r, d, f)$ obtained in step S109.

Further, in the present system, the shift amount of the adjusting bar 64 corresponds, not to the adjustment amount of the distortion correcting pattern, but to an adjustment amount of the focal position data "d". Accordingly, when the adjusting bar 64 shifts from top to bottom, the distortion correcting pattern of a certain image may be altered from the barrel pattern to the pin-cushion pattern and meanwhile, the distortion correcting pattern of another image may be altered from the pin-cushion pattern to the barrel pattern. As above, if the alteration directions of the distortion correcting patterns are reversed depending on images, the user may be confused. Therefore, it is preferable that the camera CPU 10A of the present system appropriately reverses the relationship between a shift direction of the adjusting bar 64 and an adjustment direction of the focal position data "d" depending on images, so that the alteration directions of the distortion correcting patterns match without depending on the images. Note that the presence/absence of necessity of reversal may be determined by the camera CPU 10A for each image based on the contents of the relational expression $D(r)=D(r, d, f)$ obtained in step S109.

[First Modified Example of Second Embodiment]

Figure 13:
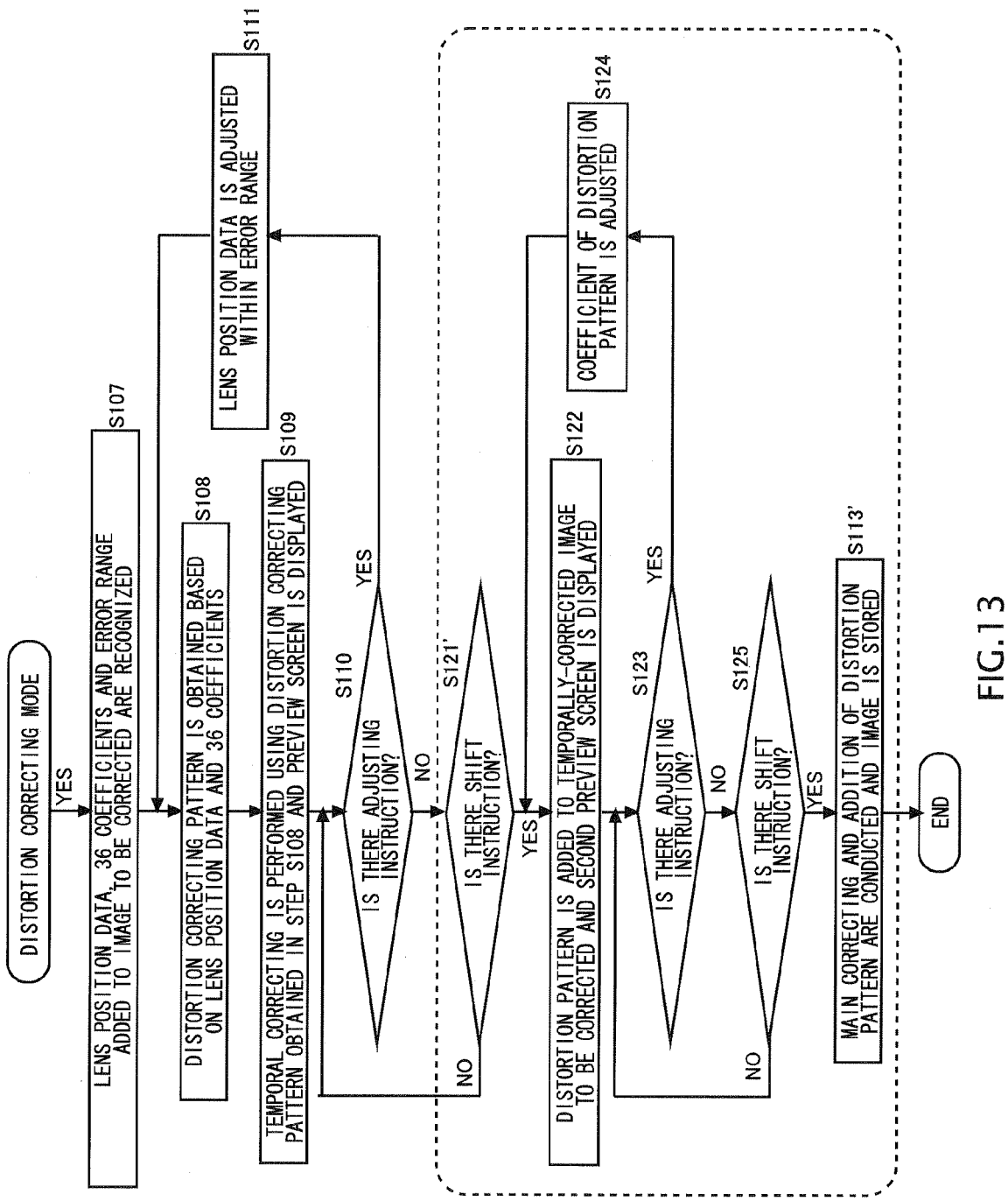
FIG. 13 is a view showing a first modified example of a second embodiment.

Note that although the distortion correcting mode described in the second embodiment is a distortion correcting mode for completely eliminating the distortion pattern of the image to be corrected, the operation flow chart shown in FIG. 11 may be modified as shown in FIG. 13 so that a specific distortion pattern can be supplied to the image to be corrected when the user desires. A dashed line portion in FIG. 13 is the modified part.

In that case, "shift button" instead of the main correcting button 65 is disposed on the aforementioned preview screen. When the shift button is selected (YES in step S112'), the camera CPU 10A temporally supplies a simple distortion pattern represented by $D(r)=\alpha r^2$ or the like to the aforementioned temporally-corrected image to be corrected, and displays a second preview screen on the rear monitor 17 (step S122). Note that "temporal supply" indicates, not the supply with respect to the image to be corrected for storage, but the supply with respect the image to be corrected for display.

On the second preview screen, the temporally-supplied image to be corrected, an adjusting bar used when the user adjusts a value of a coefficient $\alpha$, and a main correcting button are disposed. When the user shifts the adjusting bar on the second preview screen, the camera CPU 10A regards that an adjusting instruction is input (YES in step S123), adjusts the coefficient $\alpha$ (step S124) and then returns to step S122.

Therefore, on the second preview screen, the distortion pattern of the image to be corrected is changed in real time in accordance with the shift of the adjusting bar.

Accordingly, the user is only required to repeat the shift of the adjusting bar until he or she is satisfied with the image to be corrected. When the user is satisfied with the image to be corrected, he or she selects the main correcting button to input the instruction of main correcting into the camera CPU 10A.

When the instruction of main correcting is input (YES in step S125), the camera CPU 10A performs the main correcting using the distortion correcting pattern D'(r) used at the time of the last temporal correcting to which D(r) determined in the temporal supply is added. Subsequently, the camera CPU 10A newly forms an image file of the image to be corrected, and stores it in the card memory 16 (step S113'). Note that "main supply" indicates the supply with respect to the image to be corrected for storage.

Specifically, steps S108 to S111 of the present system correspond to the processing for eliminating the distortion of the image, so that when the distortion is left on the image, the distortion is additionally supplied in steps S122 to S124.

[Second Modified Example of Second Embodiment]

Further, the entire of the image to be corrected is displayed on the display region 61 on the preview screen described in the second embodiment, but, it can be modified so that the user can enlarge and display a part of the image to be corrected.

Figure 14:
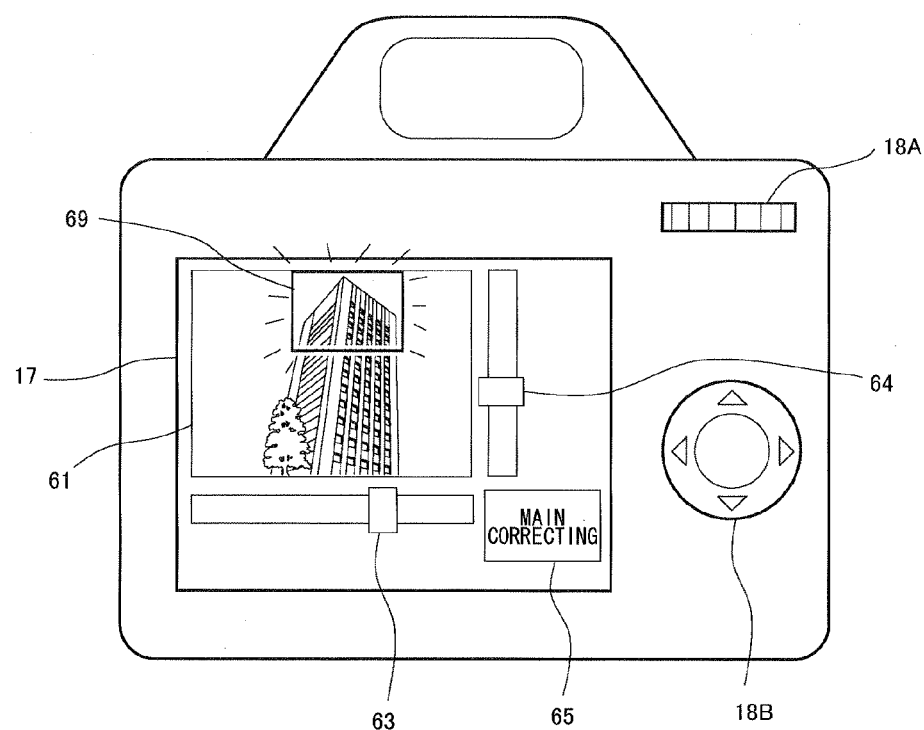
FIG. 14 is a view for explaining a second modified example of the second embodiment (state in which a rectangular frame is displayed on an image to be corrected).
Figure 15:
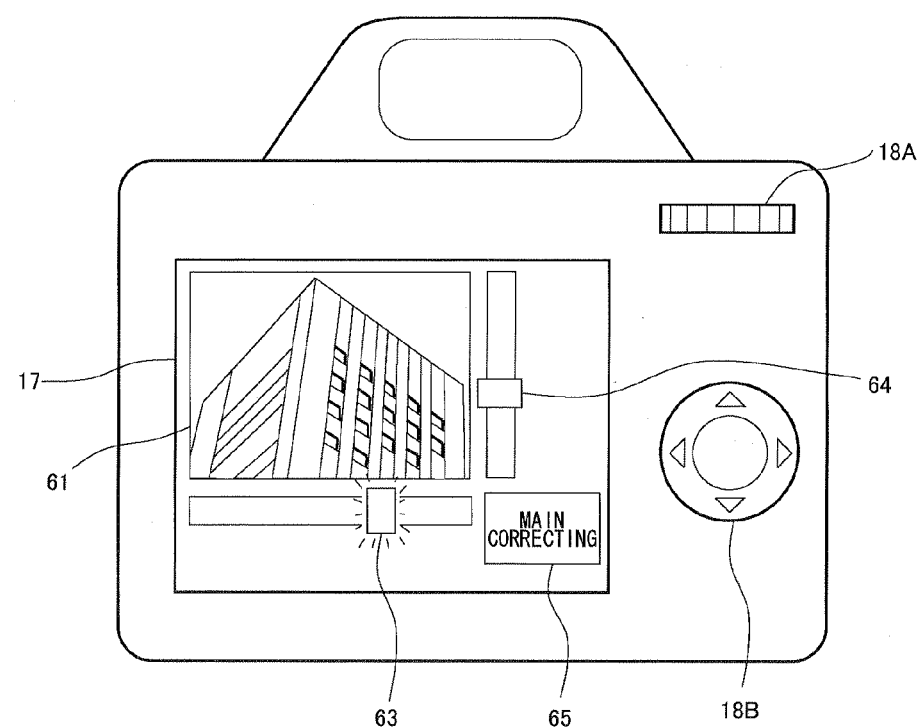
FIG. 15 is a view for explaining the second modified example of the second embodiment (state in which an inside the rectangular frame is enlarged to be displayed).

In that case, as shown in FIG. 14, a rectangular frame 69 is disposed on the display region 61 at the beginning of the display of the preview screen. When the user makes the cursor on the preview screen jump to the rectangular frame 69 and operates the command dial 18A under the state, a disposition place of the rectangular frame 69 can be moved in the display region 61. When the user moves the rectangular frame 69 to a desired position and presses the decision button of the multi-selector 18B under the state, a partial image of the image to be corrected framed by the rectangular frame 69 is enlarged and displayed on the entire of the display region 61, as shown in FIG. 15. When the user shifts at least either of the adjusting bars 63 and 64 under the state, a distortion pattern of the partial image displayed on the display region 61 is changed in real time. The user is only required to repeat the shift of the adjusting bars 63 and 64 until he or she is satisfied with the partial image.

For example, if the user enlarges and displays a part of the image to be corrected in which the distortion is noticeable (geometric picture on an end portion of the image to be corrected, or the like), and shifts the adjusting bars 63 and 64 under the state, it becomes easy to determine whether the distortion of the image to be corrected is suppressed or not.

Note that in this case, a target of the temporal correcting performed by the camera CPU 10A may not be the entire of the image to be corrected, and may be limited only to the partial image being displayed.

Further, it is a peripheral region of the image where the distortion is noticeable, so that a movable range of the rectangular frame 69 is not necessarily a total range of the display region 61, and thus there is no problem if the movable range is limited only to the peripheral region of the display region 61.

[Others]

Note that in the present system, the adjustment range of the focal distance data "f" is designed to match the error range of the focal distance data "f", and the adjustment range of the focal position data "d" is designed to match the error range of the focal position data "d", but actually, it is preferable to set the adjustment ranges to be little wider than the error ranges to completely cover the error ranges.

Further, in the present system, the adjustment target adjusted by the user is set to both the focal position data "d" and the focal distance data "f", but, it may be limited to only one of the above pieces of data. Incidentally, the measurement error of the focal distance data "f" tends to generate a larger estimation error, so that when the adjustment target is limited to only one of the above pieces of data, it is preferable to adopt the focal distance data "f".

Further, the aforementioned expressions (1) to (4) may be changed according to need. Incidentally, as the distortion pattern generated by the shooting lens becomes complicated, the necessity for increasing the number of terms in the expressions (1) to (4) becomes high.

Further, in the present system, the main correcting is performed on the image to be corrected, but, it is also possible to add information necessary for performing the main correcting (information on the distortion correcting pattern D'(r) or the like) to the image file of the image to be corrected, instead of performing the main correcting on the image to be corrected. In that case, it becomes possible to conduct the main correcting using another device such as a computer.

Further, in the error range information (FIG. 2A and FIG. 2B) of the present system, the error range of the focal position data "d" is indicated by an absolute value such as (0.3 m to 0.35 m) and the like, but, it may be indicated by a relative value such as (0 m to +0.5 m) and the like.

Further, in the error range information (FIG. 2A and FIG. 2B) of the present system, the error range of the focal distance data "f" is indicated by an absolute value such as (10 mm to 11 mm) and the like, but, it may be indicated by a relative value such as (−0.5 mm to +0.5 mm) and the like.

Note that in the present system, a part of the operation of the camera CPU 10A may be performed, separately from the camera CPU 10A, by a dedicated circuit provided in the camera body 10.

Further, in the present system, the operation flow chart of the distortion correcting mode is executed by the camera body 10, but, a part or all of the operation flow chart may be executed by a computer, image storage, a printer with a monitor, and the like.

Incidentally, when a part or all of the operation flow chart is executed by a CPU of the computer, a program (distortion correcting program) for realizing the execution is installed in the computer via a recording medium such as a CD-ROM or the Internet.

When the distortion correcting program is installed in the computer, it is preferable, in order to suppress an information amount of information to be previously stored by the interchangeable lens 11, that coefficient information and error range information on various types of interchangeable lenses are previously written into the distortion correcting program. In that case, pieces of information that the camera body 10 reads from the interchangeable lens 11 and adds to the image file are two pieces of information, which are type information and lens position data on the interchangeable lens.

Further, in that case, the distortion correcting program is preferably updated each time a new type of the interchangeable lens is released. The updated information may be made publicly available on the Internet by a manufacturer of the interchangeable lens, and the user may download the information into the computer via the Internet.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be restored to, falling within the scope thereof.

What is claimed is:

1. A computer-implemented distortion correcting method, the computer comprising a processor, the method comprising:
    a preparation operation of respectively obtaining actual measured lens position information obtained by an optical system at a time of shooting an image via the processor, an error range in the lens position information, and a relational expression between a distortion pattern given by the optical system to the image and the lens position information;
    a correcting operation of estimating the distortion pattern of the image shot by the optical system by fitting actual measured data of the lens position information to the relational expression via the processor, and performing distortion correcting on the image at least once or more to obtain one or more temporary corrected images;
    a selection operation of selecting via the processor, based on at least one of the temporary corrected images obtained in the correcting operation, a distortion correcting pattern to be applied in main correcting performed on the image; and
    a repeating operation of repeating via the processor the correcting operation by adjusting a value of the actual measured data to be fit to the relational expression in the correcting operation within the error range when the distortion correcting pattern to be applied in the main correcting is not selected.

2. The distortion correcting method according to claim 1, wherein in the selection operation, a preview display showing one of the temporary corrected images is performed and the selection is made based on an input indicating a propriety of the image in the preview display.

3. The distortion correcting method according to claim 2, wherein:
    in the selecting operation, an input for adjusting the value of the actual measured data is accepted based on a result of the preview display; and
    in the repeating operation, the value of the actual measured data to be fit to the relational expression in the correcting operation is adjusted in accordance with the input for adjusting the value of the actual measured data.

4. The distortion correcting method according to claim 2, wherein the image to be displayed in the preview display is an enlarged image of a region of a part of one of the temporary corrected images.

5. The distortion correcting method according to claim 4, wherein the region of the part of one of the temporary corrected images is designated in accordance with an input from an outside.

6. The distortion correcting method according to claim 1, wherein in the selection operation, the selection is made based on an amount of distortion left on one of the temporary corrected images.

7. The distortion correcting method according to claim 1, wherein the lens position information includes at least either of an actual measured focal position and an actual measured focal distance each being obtained when the optical system performs shooting.

8. A non-transitory computer readable program recording medium storing a distortion correcting program causing a computer to execute the distortion correcting method according to claim 1.

9. A computer-implemented distortion correcting method, the computer comprising a processor, the method comprising:
- a preparation operation of obtaining via the processor a relation between a distortion pattern given by an optical system to an image and lens position information on the optical system, as distortion pattern information approximated through a function using shooting condition information set in the optical system;
- a correcting operation of estimating via the processor the distortion pattern of the image shot by the optical system by fitting actual measured data of the optical system at a time of shooting the image included in the lens position information to the relation, and performing distortion correcting on the image at least once or more to obtain one or more temporary corrected images;
- a selection operation of selecting via the processor, based on at least one of the temporary corrected images obtained in the correcting operation, a distortion correcting pattern to be applied in main correcting performed on the image; and
- a repeating operation of repeating via the processor the correcting operation by adjusting a value of the actual measured data to be fit in the correcting operation when the distortion correcting pattern to be applied in the main correcting is not selected.

10. A non-transitory computer readable program recording medium storing a distortion correcting program causing a computer to execute the distortion correcting method according to claim 9.

11. A distortion correcting device, comprising:
- a preparation section obtaining actual measured lens position information obtained by an optical system at a time of shooting an image, an error range in the lens position information, and a relational expression between a distortion pattern given by the optical system to the image and the lens position information, respectively;
- a correcting section estimating the distortion pattern of the image shot by the optical system by fitting actual measured data of the lens position information to the relational expression, and performing distortion correcting on the image at least once or more to obtain one or more temporary corrected images;
- a selection section selecting, based on at least one of the temporary corrected images obtained in the correcting section, a distortion correcting pattern to be applied in main correcting performed on the image; and
- a repeating section making the correcting section repeat an operation of the correcting section by adjusting a value of the actual measured data to be fit to the relational expression in the correcting section within the error range when the distortion correcting pattern to be applied in the main correcting is not selected.

12. The distortion correcting device according to claim 11, wherein the selection section performs a preview display showing one of the temporary corrected images on a display device and makes the selection based on an input indicating a propriety of the image in the preview display.

13. The distortion correcting device according to claim 12, wherein:
- the selection section accepts an input for adjusting the value of the actual measured data based on a result of the preview display; and
- the repeating section adjusts the value of the actual measured data to be fit to the relational expression in the correcting section in accordance with the input for adjusting the value of the actual measured data.

14. The distortion correcting device according to claim 12, wherein the image to be displayed in the preview display is an enlarged image of a region of a part of one of the temporary corrected images.

15. The distortion correcting device according to claim 14, wherein the region of the part of one of the temporary corrected images is designated in accordance with an input from an outside.

16. The distortion correcting device according to claim 11, wherein the selection section makes the selection based on an amount of distortion left on one of the temporary corrected images.

17. The distortion correcting device according to claim 11, wherein the lens position information includes at least either of an actual measured focal position and an actual measured focal distance each being obtained when the optical system performs shooting.

18. An electronic camera, comprising the distortion correcting device according to claim 11.

19. A distortion correcting device, comprising:
- a preparation section obtaining a relation between a distortion pattern given by an optical system to an image and lens position information on the optical system, as distortion pattern information approximated through a function using shooting condition information set in the optical system;
- a correcting section estimating the distortion pattern of the image shot by the optical system by fitting actual measured data of the optical system at a time of shooting the image included in the lens position information to the relation, and performing distortion correcting on the image at least once or more to obtain one or more temporary corrected images;
- a selection section selecting, based on at least one of the temporary corrected images obtained in the correcting section, a distortion correcting pattern to be applied in main correcting performed on the image; and
- a repeating section making the correcting section repeat an operation of the correcting section by adjusting a value of the actual measured data to be fit in the correcting section when the distortion correcting pattern to be applied in the main correcting is not selected.

20. An electronic camera, comprising the distortion correcting device according to claim 19.

* * * * *